United States Patent [19]

Lieberman

[11] Patent Number: 5,424,013
[45] Date of Patent: Jun. 13, 1995

[54] THERMOPLASTIC CLOSED LOOP RECYCLING PROCESS

[76] Inventor: Mark Lieberman, 1256 Westview, Bloomfield Hill, Mich. 48304

[21] Appl. No.: 103,298

[22] Filed: Aug. 9, 1993

[51] Int. Cl.6 .......................... B29B 7/48; B29B 7/66; B29B 7/72
[52] U.S. Cl. ...................... 264/40.1; 264/37; 264/211; 264/211.23; 264/102; 264/349; 264/DIG. 69; 425/DIG. 46
[58] Field of Search ............... 264/37, 349, 211.23, 264/DIG. 69, 40.1, 211, 101, 102; 425/DIG. 46

[56] References Cited

U.S. PATENT DOCUMENTS

| | | | |
|---|---|---|---|
| 3,551,943 | 1/1971 | Staton et al. | 425/197 |
| 3,562,373 | 2/1971 | Logrippo. | |
| 3,567,815 | 3/1971 | Frank. | |
| 3,608,001 | 9/1971 | Kowalski et al. | 425/197 |
| 3,687,873 | 8/1972 | Kropscott et al. | |
| 3,976,730 | 8/1976 | Cushing. | |
| 4,063,860 | 12/1977 | Cushing | 264/DIG. 69 |
| 4,065,532 | 12/1977 | Wild et al. | |
| 4,139,309 | 2/1979 | Billingsley. | |
| 4,244,903 | 1/1981 | Schnause. | |
| 4,448,737 | 5/1984 | Johnson | 264/DIG. 69 |
| 4,707,514 | 11/1987 | Katsuki et al. | |
| 4,900,156 | 2/1990 | Bauer. | |
| 4,983,648 | 1/1991 | Laughner et al. | |
| 5,122,398 | 6/1992 | Seiler et al. | |
| 5,145,617 | 9/1992 | Hermanson et al. | |
| 5,165,941 | 11/1992 | Hawley. | |
| 5,176,861 | 1/1993 | Ishikawa. | |
| 5,225,130 | 7/1993 | Deiringer | 264/DIG. 69 |

FOREIGN PATENT DOCUMENTS 7810978 5/1980 Netherlands .......................... 264/37

OTHER PUBLICATIONS

High–performance twin–screw compounding system, Werner & Pfleiderer.

*Primary Examiner*—Mathieu D. Vargot
*Attorney, Agent, or Firm*—Basile and Hanlon

[57] ABSTRACT

A closed loop thermoplastic recycling process includes the step of testing particulated processed plastic material to determine the properties thereof. The tested properties are compared with targeted near virgin properties of the processed plastic material to determine any difference(s) therebetween. Additives based on the property differences determined during testing are admixed with the particulates in a twin screw extruder. During extruding, volatile constituents are simultaneously withdrawn from the fused particulates. The twin screws of the extruder are provided with a number of screw sections, each having a thread with predetermined degrees of chamfer and pitch length. Kneading blocks are mounted on certain screw sections prior to a vacuum vent port disposed along the feed path of the melt stream in the extruder. The extruded material is tested to determine if any property differences exist. If no unacceptable tested differences are found, the extruded material is prepared for reuse in place of or in conjunction with virgin plastic material having the same properties and characteristics.

16 Claims, 3 Drawing Sheets

THERMOPLASTIC CLOSED LOOP RECYCLING PROCESS

BACKGROUND OF THE INVENTION

1. Field of the Invention

The present invention relates, in general, to processes for recycling thermoplastic material.

2. Description Of The Art

Plastic materials of all types have found many uses in a large number of consumer products. However, such widespread use of plastics has created a problem relating to the disposal of plastic consumer products after their useful life. In addition to used consumer products, waste parts, bad parts, scrap, runners, sprues, purgings, etc., generated from plastic manufacturing processes must also be disposed of.

Currently, plastic materials are incinerated, buried in a land fill, provided with biodegrading properties or, and only currently to a small extent, recycled. Incineration obviously creates a potential environmental problem and is particularly disfavored. Available land fills are becoming crowded and less available, particularly as the use of plastic increases and the amount of land available for land fills decreases. With regard to biodegradable plastics, not a significantly high percentage of such plastics are biodegradable and, even if biodegradable, are costly.

Recycling then becomes the most promising method of "disposing" of plastic materials in used consumer products as well as plastic materials generated during the manufacture of consumer products. The oldest and most used method of recycling involves use of relatively homogeneous recycle. The process disclosed in U.S. Pat. No. 3,567,815 uses high bulk density polystyrene blended with reclaimed low bulk density polystyrene to provide an extruded polystyrene sheet with a uniform thickness. U.S. Pat. No. 3,976,730 defines a special process for adding virgin polyethylene to ground, low bulk density, reclaimed, polyethylene film to yield an uninterrupted blown film of polyethylene.

In some cases, such as in the process disclosed in U.S. Pat. No. 5,122,398, great effort is directed to producing items out of a single base material. In the '398 process, a bumper is produced out of a combination of a glass reinforced polypropylene bumper support layer with a foamed polypropylene core and an outer layer of rubber modified polypropylene. Since all material is polypropylene, or compatible with polypropylene, the entire bumper can be recycled with the dispersed reinforcing glass fiber and the dispersed rubber particles not detracting from properties of the polypropylene.

A typical recycling process involving plastic materials requires sorting the products according to the different types of plastics contained therein. Sorting is typified by U.S. Pat. No. 5,176,861 which describes a process to recycle sorted polyester items, such as bottles, trays and other containers. This process allows conversion of the sorted consumer waste into usable uniaxially oriented polyester sheet which can be further transformed into a variety of useful items. Processes, such as described in the above '815 and '730 patents, are known for mixing small percentages, typically up to 20% of the same virgin plastic with the low density reground used or scrap plastic material to increase the bulk density so it can then be extruded and reformed into useful products similar to those that could be formed if virgin material of slightly lower molecular weight were used.

Dealing with mixed waste with inherently incompatible materials is much more difficult. In U.S. Pat. No. 5,145,617 a high quality composite roofing membrane trimming waste stream composed of a fiber modified composite of PVC and PET is treated. This process is successful in reclaiming a usable material for applications which have low property requirements, such as roof pads of the type used to provide pathways for workers applying membrane material to roofs, etc. The process disclosed in U.S. Pat. No. 3,687,873 attempts to deal with a variety of mixed waste streams by the addition of chlorinated polyethylene (CPE) as a compatibilizing agent. While properties are improved over that of the blends without the CPE they are still greatly reduced from virgin material. For example, an ABS with a tensile strength of 6004 psi is mixed 50/50 with polystyrene having a tensile strength of 6000. The blend has a tensile strength of 881 psi which is raised to a still low value of 2756 when CPE is added.

The above-described recycling process is applicable only to commodity type plastics, such as polyethylene, polypropylene and styrenes. Such recycling processes are not easily used with engineering plastics, including glass or mineral reinforced plastic or plastics which are modified by use of various additives for a particular purpose, such as materials having a high impact strength, tensile strength, etc. Examples of such engineering plastics include polycarbonate, Nylon, acetal, ABF, and the like.

The use of engineering plastics in automobiles is increasing for a variety of applications, including exterior or interior parts of the vehicle which require painting. Painted engineering plastic parts create additional problems which has heretofore prevented their easy recycling into new products. Often when a painted part has a flawed surface, the flaw may be corrected by repainting. Sometimes as many as four coats of paint will be used before the part is scraped. The presence of paint specks in reclaimed parts gives a flawed appearance and greatly reduces all important physical properties of the plastic material.

Thus, it would be desirable to provide a process for recycling thermoplastic materials which enables processed plastic materials to be rejuvenated into plastic material having nearly the same key properties and key characteristics as virgin plastic materials. It would also be desirable to provide a process for recycling thermoplastic materials and blends of thermoplastic materials which rejuvenates engineering plastics to a state having major properties nearly equal to the same or other virgin plastic materials. It would also be desirable to provide a process for recycling thermoplastic materials which enables painted plastics to be recycled. It would be particularly desirable to have a process which is capable of removing paint specks from multi-coated painted plastic parts being reclaimed.

SUMMARY OF THE INVENTION

The present invention is a process for recycling thermoplastic material. The process includes the steps of:
 particulating pre-processed plastic material having a known composition to form particulates thereof;
 testing the particulates to determine the properties thereof;

comparing the tested properties with the properties of similar, near virgin plastic material to determine a difference therebetween;

after testing, introducing the particulates into a twin screw extruder;

admixing additives to the particulates based on the property difference determined during testing;

during extruding, simultaneously withdrawing volatile constituents from the particulates;

optionally retesting the extruded material to determine any differences in the properties of the extruded material from the properties of similar, near virgin plastic material; and preparing the extruded material for re-use as virgin plastic material.

The step of admixing the additives may take place at the feed end of the extruder or in separate steps at spaced locations along the length of the extruder.

The step of withdrawing volatile constituents preferably comprises the step of removing volatile constituents under vacuum at at least one and preferably a plurality of spaced locations along the length of the extruder.

The present process also optionally includes the steps of:

forming a plurality of axially aligned shaft sections on each of the twin screws of the extruder, each shaft section having a flight with a predetermined pitch formed thereon; and providing kneading blocks at predetermined locations along each screw of the extruder. Preferably, the kneading blocks are provided immediately prior to each vacuum vent port along the length of the extruder.

The present process also optionally includes the step of:

introducing water into the extruder in predetermined quantities prior to withdrawing volatile constituents therefrom. Preferably, water is added in an amount between 0.2 and 5% by weight of the total polymeric stream.

The present invention also defines a process for reclaiming multi-coated painted plastic parts whereby the process comprises the steps of:

first melt granulating painted plastic parts being recycled in a low shear extruder without the high shear field required to disperse the paint excessively;

then capturing large segments of intact paint film at the outlet of the extruder, preferably by means of a screen pack mounted at the outlet of the extruder; and dispersing at least one of a polymer found in mixed recycle streams and property enhancing additives into the granulated plastic in a high shear compounding extruder.

This invention will further provide an extruded blend composition consisting mainly of recycled plastic formed by a process comprising the steps of:

passing a recycled blend through a compounding type extruder;

adding an additional amount of the tougher component, either recycle or virgin, to the recycled blend so that the tougher component is forced to be the continuous phase; and adding a compatibilizing agent prior to the compounding to the extent of at least 1% by weight.

This invention will still further provide the blend above wherein the tougher component is polycarbonate. In a further embodiment this invention provides the above-described blend wherein the compatibilizing agent is a copolymer or a terpolymer containing butadiene. In a still further embodiment this invention provides the blend wherein the compatibilizing agent is a terpolymer containing methylmethacrylate, butadiene, and styrene.

In a still further embodiment this invention provides the above process wherein the paint has a polyurethane resin as the major resinous component. In a still further embodiment this invention provides the above process wherein the extruded pellets are cut underwater to further reduce the level of isocyanate in the atmosphere and in the pellets of reclaimed recycled polymeric material. In a further embodiment this invention provides the above process wherein the water is added at levels between 0.2 and 5% by weight of the total polymeric stream.

The process for recycling thermoplastic materials of the present invention uniquely enables plastic material either in used consumer product form or resulting from waste or bad parts or the sprues, runners and purgings resulting from plastic molding operations, to be returned to a near virgin state having all or nearly all of the important or major original properties and characteristics of the virgin material forming the recycled plastic so as to be able to be reused in the same manner as virgin plastic material. The process is simple in execution and enables, for the first time, a large number of different types of thermoplastic materials, such as, for example, engineering plastics, to be recycled thereby decreasing the overall cost of processing such thermoplastic materials since the need for disposal of such used or scrap plastic materials in landfills or their subsequent reuse with appropriate additives in lower quality products is eliminated.

The present recycling process is also usable with painted plastic materials and, in particular, painted engineering plastics, and enables such painted materials to be recycled and rejuvenated to their original properties by decomposing then removing the volatile paint decomposition products therefrom in an environmentally safe manner without detracting from the properties of such plastic materials.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
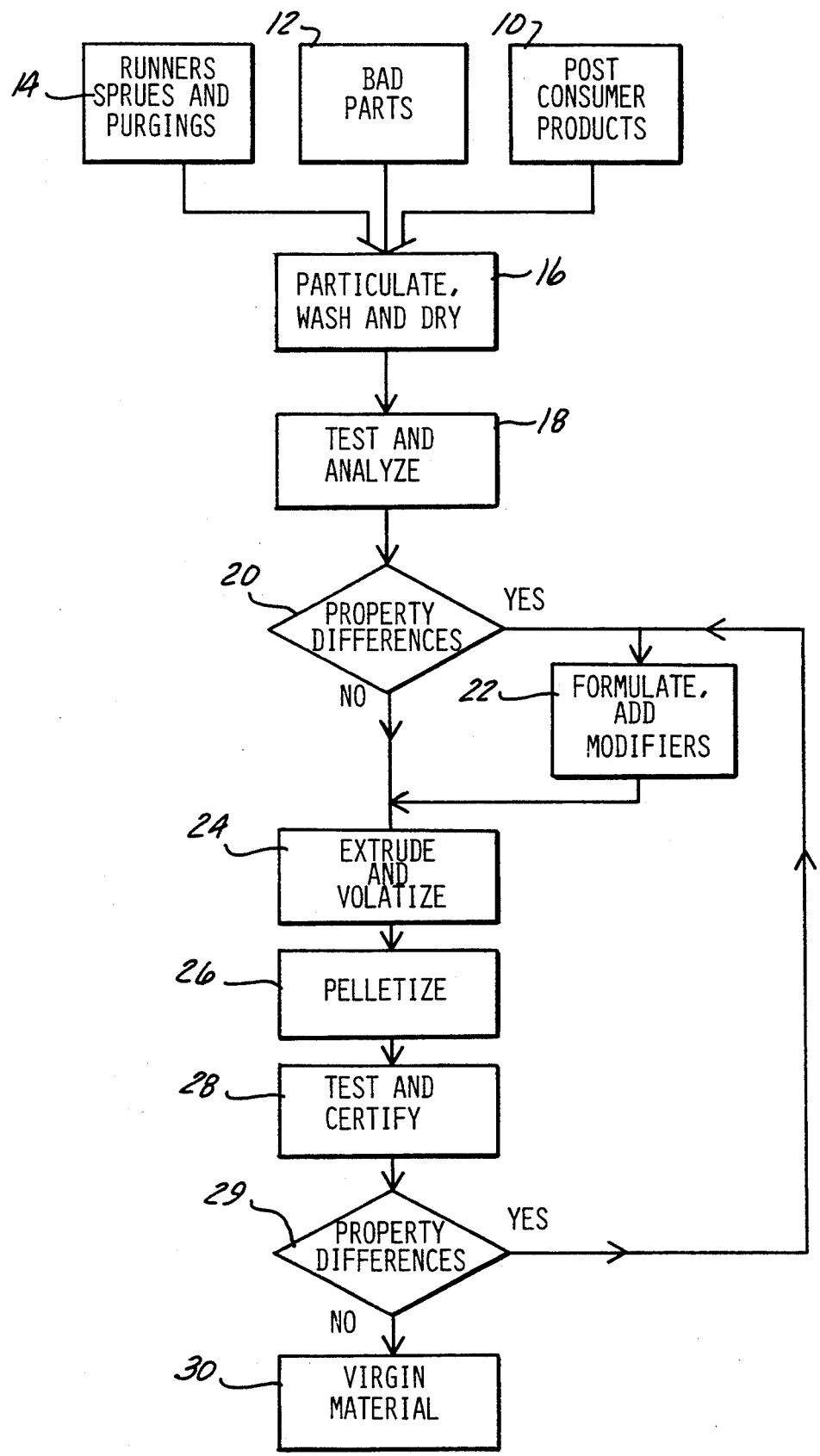
FIG. 1 is a block diagram illustrating the steps of the inventive process.

As shown in FIG. 1, the present invention is a process for recycling thermoplastic materials which rejuvenates processed plastic materials into a form having the same properties as the original or virgin plastic material.

The steps of the present process are shown in FIG. 1. First, thermoplastic material is collected from a number of sources including post consumer products 10, such as those discarded after their useful life. In addition, a source of plastic material for recycling includes bad or inferior parts 12 generated during the manufacture of various consumer products as well as the runners, sprues and purgings 14 generated during the molding of thermoplastic materials into consumer products.

The collected plastic material is, where practical, segregated by type to enhance the ability to return the used or processed plastic material to a state having the same or nearly the same key properties as the same or another material has in its original, virgin form. A batch of such plastic material from either or all of the sources 10, 12 or 14 shown in FIG. 1 are collected.

Plastic material collected from any of the sources 10, 12 and/or 14 may include any or all of the following materials which are listed by way of example only, and not meant to be inclusive of plastic materials which can be recycled according to the present process. Such plastic materials include: ABS, polyacetal, acrylic, ionomer, polyamide in general, Nylon 6, Nylon 6/6, Nylon 6/9, Nylon 6/10, Nylon 6/12, Nylon 11, Nylon 12, polycarbonate, polyester (PBT), polyester (PET), polyether etherketone, polyethylene, polyolefin in general, polyphenylene ether, polyphenylene sulfide, polypropylene, polystyrene, polysulfone, polyurethane, SAN and thermoplastic elastomer. While the present invention may be useful with some of the commodity thermoplastics, such as low density polyethylene, polypropylene homopolymer, crystal polystyrene, rigid polyvinyl chloride, and the like, and more of the intermediate thermoplastics, such as polymethyl methacrylate, acrylonitrile-butadiene-styrene, acrylonitrile/acrylate/styrene, acrylonitrile/ethylene-propylene(EPDM)/styrene, styrene/maleic anhydride copolymers and rubber blends, cellulose-acetate-butyral, thermoplastic olefin elastomer, and the like, it is directed primarily toward the recycle of the engineering plastics. Examples of such engineering plastics include polycarbonate, polyphenylene ether, many of the polyesters and polyester blends, polyamides, acetal polymers and copolymers, thermoplastic polyurethanes, and the like. The present invention is also useful with some of the high performance polymers, such as glass filled polyphenylene sulfide, glass filled liquid-crystal polymer, polyetheretherketone, and polyethersulfone. The present invention is particularly useful with many blends containing two or more of the above plastics. In some cases these blends will be made by choice to obtain an alloy with superior properties, such as polycarbonate with ABS or polycarbonate with polybutylene terephthalate. In other cases the blend will be forced because the item being recycled contains two different materials. Two different materials may have been used as an economy measure. For example a tail light lens might be molded of polycarbonate where its transparency and particular high strength is required and of polymethylmethacrylate where only moderate strength is required with transparency. Another example may be a bumper where the bumper support is formed from glass fiber reinforced polypropylene and the core is formed from foamed polypropylene; but the impact resistant plastic shell is formed of polyurethane.

These plastics and blends of these plastics to be recycled by our invention may be modified with various additives including ultraviolet absorbers, antioxidants, pigments, fiber glass, carbon fibers, ceramic fibers, various minerals, rubber dispersions, for particular purposes such as increased tensile strength, increased impact strength, increased modulus, increased adhesion, improved aging characteristics, etc.

According to the present invention, as shown in FIG. 1, the plastic material is particulized into small particles in step 16. The particulation step may take place in any suitable machine for breaking up plastic into a small particulate form. The particulate material is then optionally washed and dried.

Next, the particulate material is then tested in step 18 to determine its physical properties. A small portion of the particulate material is formed into small test plaques or test samples to enable convenient testing of such samples to determine their properties or characteristics.

Any number of tests may be performed on the test plaques including, but not necessarily limited to the following tests: notched izod impact strength melt flow to indicate viscosity, rheological testing, tensile yield strength, tensile break strength, flexural modulus for stiffness, durometer, break elongation to determine elasticity, visual surface appearance, linear mold shrinkage, density, tensile modulus, compressive strength, linear thermal expansion, deflection temperature at 264 lb/in$^2$, volume resistivity, surface resistivity, dielectric strength, dielectric constant, dissipation factor and water absorption. The first nine listed tests are those more frequently employed in the present method, but any of these tests, used singly or in combination with any other of the listed tests or any unlisted tests may be performed on the test plaques depending upon the nature of the particulate plastic material and the desired key properties.

The results of the various tests performed on the particulate material are then analyzed and compared with the important or key properties and characteristics of the original plastic material or with other virgin resin from which the particulate material was generated. This comparison yields a clear indication of any differences in any of the tested key properties or characteristics of the material. If there are no differences between the key properties of the tested particulate material and the corresponding targeted near virgin properties, step 20, the next step in the present process is to extrude the particulate material in a twin screw extruder in step 24, as described hereafter.

However, since some degradation in properties is likely to occur during the initial manufacturing of such plastic materials into various products or in such materials during the useful life of products made from such materials, the present process contemplates a formulation and addition of various additives to the particulate material in step 22 which will rejuvenate the particulate material by changing the properties of such material back to its targeted, near virgin state. Such additives and their amounts will be determined based on the tested differences in the properties of the particulate material from corresponding original properties of virgin material of the same type.

A variety of additives may be employed. By way of example and not inclusion, such additives may include any one or combinations of the following materials: antioxidants, heat stabilizers, antimony oxide, block copolymer rubber or other impact modifiers, maleic anhydride, antistats, lubricants, organic peroxides, plasticizers, UV stabilizers, talc, nucleating agents, calcium carbonates, dolomite, silicates, fiber glass, coupling agents, glass spheres, mica, wollastonite, silica, barium sulfate, carbon, carbon black, graphite, graphite fibers, and various polymer composites. In addition, a particular additive employed in the present process is a methylmethacrylate-butadiene-styrene polymer. Other compatibilizing agents with or without rubber may also be added. Grafted rubber concentrates made by emulsion or ionic block copolymers may also be used.

By way of example only, if the elasticity of the tested particulate material must be modified, various amounts of rubber may be added to the particulate material. Stiffness may be enhanced by use of glass or mica. Shrinkage may be reduced by use of talc or calcium carbonate. Impact resistance may be enhanced by the use of one of many rubber modified additives. A reduction in melt flow may be obtained by use of the aforementioned methylmethacrylate-butadine-styrene polymer in an amount of approximately 5% or more by weight of the particulate material.

From step 20 shown in FIG. 1, or with the addition of modifiers from step 22, the particulate material is added to the feed end 60 of a twin screw compounding extruder 38, such as one sold by Werner & Phleiderer, model number ZSK, and shown generally in FIGS. 2, 3, 4 and 5. Such an extruder 38 is a twin screw extruder in which a pair of overlapping, parallel, intermeshing screws 42 and 44 extend through a hollow housing 45. Each screw 42 and 44 is provided with variably selectible and arrangeable sections, such as sections 46, 48 and 50 for the screw 42 shown in FIG. 2. Each screw section, such as screw sections 46, 48 and 50 for the screw 42, and the meshing screw sections on the screw 44 is provided with an axially extending thread, such as threads 52 and 54. The degrees of chamfer and degrees of pitch length or flight of such threads are selected to generate the desired amount of heat, pressure and shear force to cause the particulate material to change to a liquid phase, to be completely mixed, to be completely and evenly mixed with any additives admixed with the particulate material, and to conveyed from the feed end 60 to the discharge end of the extruder 38.

Figure 4:
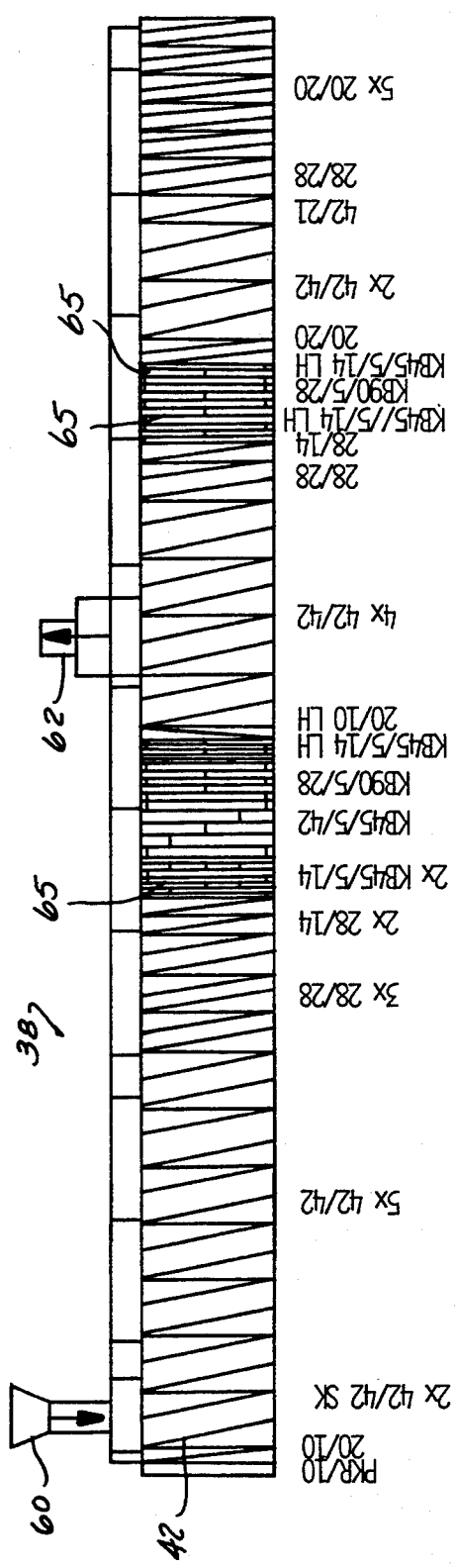
FIGS. 4 and 5 are schematic diagrams showing the various extruder screw sections used in the present process.
Figure 5:
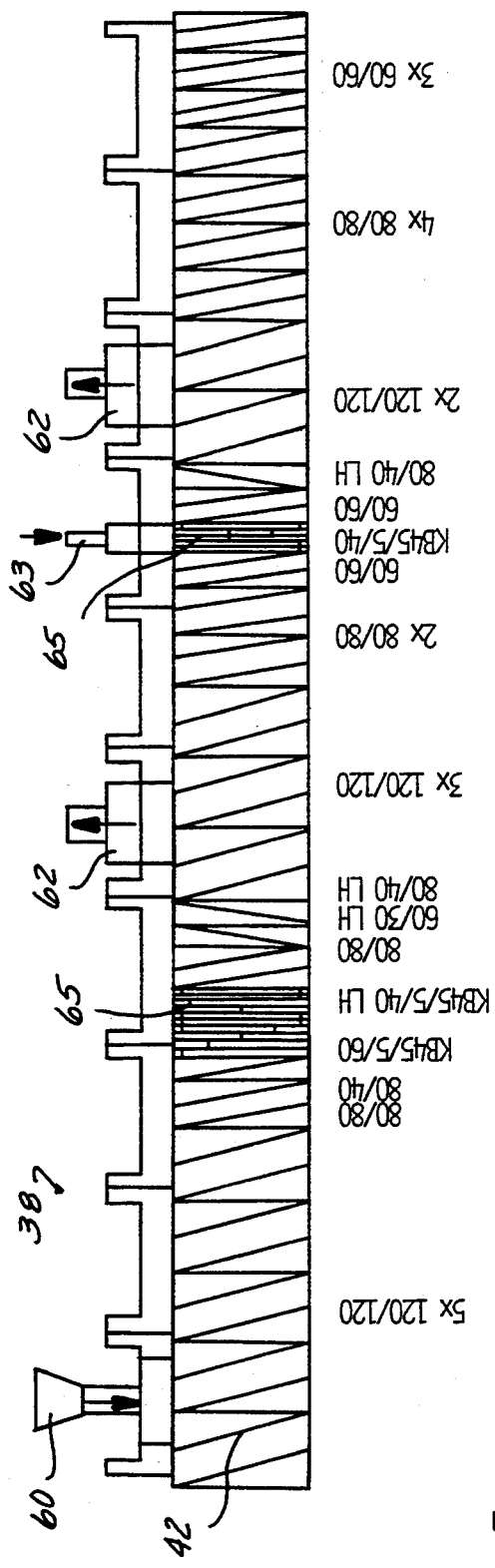

FIGS. 4 and 5 depict a serial arrangement of screw sections having different chamfer angles and pitch length angles which are arranged consecutively along each screw 42 and 44, with only the sections for screw 42 being shown, it being understood that screw 44 has identically shaped and correspondingly arranged screw sections. The numbers along side each screw section are exemplary of degrees of chamfer and degrees of pitch length of the threads in each screw section. Such different shaped screw sections provide varying amounts of heat and pressure, back pressure, kneading, etc., to convey the material from the feed end 60 to the discharge end of the extruder 38, to decompose and volatize portions of any paint or other volatile constituents from the particulate material, as well as to completely co-mingle the particulate material with any additives admixed therewith. Knead blocks 65 are mounted on the screw 42 at predetermined locations, preferably immediately ahead of a vacuum vent port 63 in the direction of flow, to provide additional shear forces to decompose and volatize paint or other volatile constituents.

The volatile constituents generated during the extrusion process are removed under vacuum by a suitable vacuum source, not shown, through a vacuum port or vent denoted generally by reference number 62 in FIGS. 4 and 5. Due to the use of the intermeshing screw sections which provide shear and kneading action, such paint is removed from the particulate material and a substantial portion thereof decomposed, volatized and removed from the extruder 38 through the vacuum vent(s) 62. Any remaining paint pigment is evenly distributed throughout the liquid plastic material so as not to affect the overall properties of the end product. One or more vacuum vents 62 may be provided along the length of the extruder 38.

It has been surprisingly found that in the case of painted plastics the introduction of water through a port 63 into a high pressure zone shortly before the vacuum ports 62 spaced along the length of the compounding extruder 38 dramatically reduces the undesired loss in material properties associated with the presence of paint and improves the appearance of the recycled plastic. More importantly, the introduction of water also lowers the amount of the toxic hexamethylene diisocyate (HMDI) both in the polymer and in the vapors from the vacuum ports 62 of the extruder 38 and in the vapors near the heated die where the polymer is being expelled prior to being cooled and pelletized. These effects are not completely understood. It has been hypothesized that added water helps to reverse polymerization in the paint resin, converting it to volatile products that can be removed. Since this should result in an increased level of HMDI, it is believed that the water reacts not only with the original traces of HMDI, but with the HMDI produced by the depolymerization. Preferably, water is added in an amount between 0.2 and 5% by weight of the total polymeric stream.

In the case of particularly heavy coats of paint produced by multiple coats, it is found that the paint removal is enhanced if the ground or particularized recycle is first extruded in a low shear, single screw compounding extruder, then forced through a screen pack of about 40 mesh or smaller mounted on the outlet end of the extruder to filter out large particles of paint or large segments of intact paint fibers.

Depending upon the desired properties of the extruded material, the additives may be applied to the particulate material in one of three different ways. First, the additives or modifiers, in step 22 shown in FIG. 1, may be mixed with the particulate material separately from the extruder 38 with the resulting mixture fed as a whole into the feed end 60 of the extruder 38. Secondly, the additives or modifiers may be admixed with the particulate material directly at the feed end 60 of the extruder 38 in separate streams input to the feed end 60. Thirdly, the additives may be admixed with the particulate material in separate additive steps through separate ports along the length of the extruder 38.

It will be understood that if, in the testing step 18 shown in FIG. 1, there are no differences between the properties of the recycled particulate material and the corresponding properties of such virgin material, the particulate material need only be extruded through the extruder 38 so that any volatile constituents thereof are removed. No additives are needed in such an instance.

The extruded material from the extruder 38 is then pelletized in step 26, shown in FIG. 1 into small granules or pellets. Test plaques or samples are then formed in step 28 from the particulate material and retested by any single or combination of tests described above in step 18 to certify that the extruded material has the same key properties as the corresponding virgin material. If there are no or minimal differences between the tested properties and the properties of virgin material, the recycled plastic material may then be re-used in a similar fashion as virgin material, step 30, to form the same parts as the original material used to form such parts which generated the scrap plastic. If key property differences are detected in step 29, the process is repeated starting at step 22 as described above.

The following examples illustrate the present invention but are not to be construed as limiting its scope.

EXAMPLE 1

Figure 2:
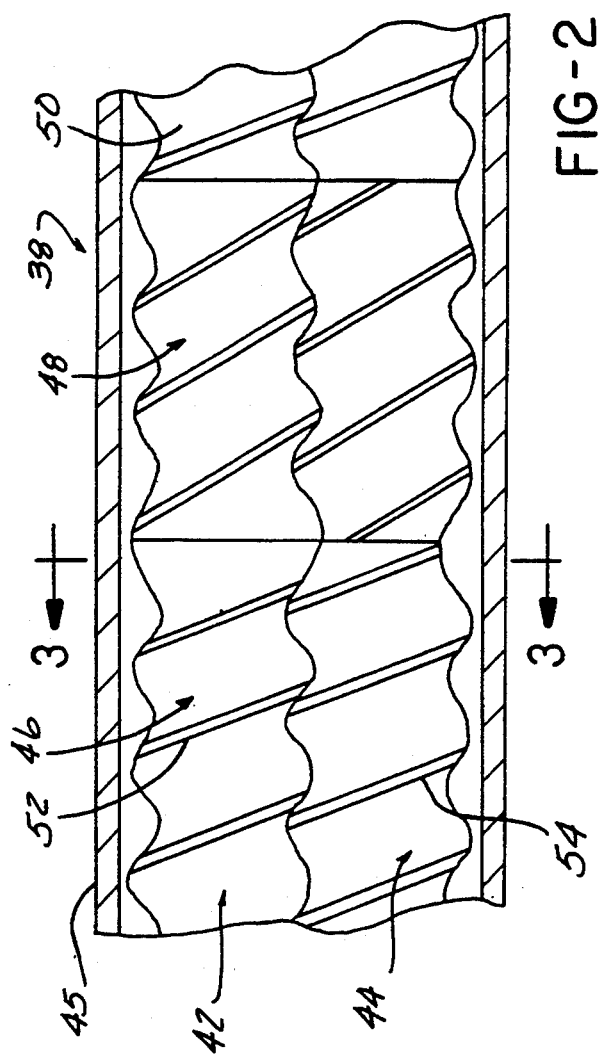
FIG. 2 is a partial cross sectional view showing a twin screw extruder used in the process of the present invention.
Figure 3:
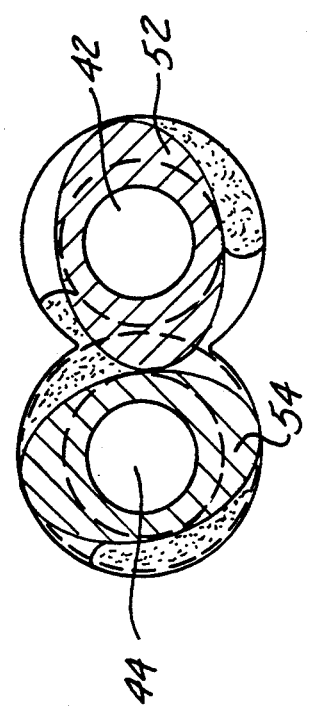
FIG. 3 is a cross sectional view generally taken along line 3—3 in FIG. 2.

Defective painted injection molded parts consisting of automobile bumpers and bumper supports formed from a commercial polycarbonate/polybutyleneterephthalate blended alloy sold by General Electric as Xenoy 1102 are granulated and extruded in a 70 mm twin screw, compounding, devolatilizing extruder similar to that shown in FIGS. 2 and 5. Temperature of the extruder barrel is maintained between 245° C. and 250° C. Granulated material is metered into the extruder at a rate of 1200 lb/hr. A vacuum of 27 inches of mercury is applied to each of the two volatile extraction ports. A small stream of water (about 12 lb/hr) is continuously added to the mixing zone just before the second vent port. The extruded plastic is at 285° to 305° C. and is in the form of strands which are cut into pellets under water then injection molded into test plaques. When these test plaques are examined they are found to have glossy uniform surfaces and to be free of the appearance of paint specks. They are very similar in appearance to test plaques molded from the virgin material. The molded test plaques are cut into proper sized specimens which are used to measure key physical properties of the recycled material.

For a short period of time the water addition is stopped and a sample of the resulting granules collected. When molded into similar test plaques it is noted that paint specks are visible. To better compare the paint specks with and without water, some thin films are made of each, at the same time, in a hydraulic press. Comparative films about 10 mils thick are then examined under a light microscope. It is noted that, under the microscope, the paint specks are visible in both specimens but the specimen produced without the water flow has about double the number of visible paint specks and such specks are larger. Addition of the water prior to the vacuum port aids the destruction of the undesired paint specks. When the two samples are examined for traces of HMDI, it is necessary to use a sensitive chromatographic technique which is not quantitively calibrated. It is noted from peak heights, however, that the sample without water injection contains about four times the amount of HMDI. It is believed that the water destroys the HMDI by reacting with it.

To demonstrate the effect of water and vacuum on the work environment surrounding the reprocessing extruder, a standard absorption air sampling device is used to absorb the HMDI from a standard volume of air at the extruder die face with the underwater pellitizer removed. Later the HMDI is desorbed and analyzed. It is found that the sample obtained while vacuum is being applied to both vent ports and water is being injected has nondetectable amounts of HMDI at a detection limit believed to be about 1 ppb. When the vacuum is removed and the water is stopped, sampling in an identical manner showed 10 ppb of the toxic HMDI in the air.

EXAMPLE 2

The ground, but unprocessed, painted recycle is also molded into test plaques. When these test plaques are examined they are found to have an abundance of visible paint specks and a very poor, irregular, speckled surface.

EXAMPLE 3

A sample of virgin pellets of Xenoy 1102 is injection molded into test plaques in the same manner as in examples 1 and 2 and is cut into appropriate test specimens. The surface is noted have a high gloss and to be uniform in appearance and to be similar in appearance to the test plaques of example 1.

Examples 1, 2 and 3 are compared in Table 1.

TABLE 1

| Test | ASTM units | Example 1 processed regrind | Example 2 unprocessed regrind | Example 3 Virgin zenoy 1102 |
| --- | --- | --- | --- | --- |
| Melt-flow | D-1238 g/10 min | 28.6 | 51.4 | 18 |
| Tensile-Strength Yield | D-638 psi | 6858 | 6570 | 7900 |
| Elongation | D-638% | 150 | 38 | 150 |
| Flexural Modulus | D-790 psi | 285,500 | 308,100 | 285,000 |
| Notched Izod | D-256 ft-lb/in | 11.08 | 4.5 | 15.0 |

EXAMPLE 4

Scrap tail light lenses composed of 45% polycarbonate and 55% polymethylmethacrylate which has been coinjection molded need to be recycled. To do this an acceptable level of impact strength must be attained. A smaller extruder, geometrically similar to that used in example 1, is used, with similar vacuum on both ports. Initially it is found that when the lenses are ground and extruded that the extruded product has unacceptable, low, impact strength. In an attempt to overcome this deficiency, a methylmethacrylate/butadiene/styrene (MBS) polymer is added to the ground tail light lenses. When the MBS polymer is added at levels of 5, 10, and 15% little improvement in the low impact strength is seen.

When the MBS level is maintained at 5% and virgin polycarbonate resin is added at increasing levels, it is noted that at about 20% addition, impact strength begins to show an improvement and at 30% addition the impact strength is acceptably high. This surprising effect is not completely understood but is believed to relate to polycarbonate being the continuous phase when better properties are obtained. The excellent properties of this material are shown in table 2.

TABLE 2

| | |
| --- | --- |
| melt index (cond O) | 8.35 g/10 min |
| melting point | 195° C. |
| tensile strength (max) | 7916 psi |
| tensile strength (yield) | 7865 psi |
| tensile strength (break) | 6921 psi |
| % elong (yield) | 13.33% |
| % elong (break) | 62.8% |
| flexural modulus | 348,500 psi |
| notched izod impact | 7.44 ft-lb/in |
| heat def temp (264 psi) | 88° C. |
| heat def temp (66 psi) | 110° C. |

EXAMPLE 5

Using the same granulated tail light lenses as example 4 and processing with 5% MBS additive, it is found that similar high impact strengths are obtained when recycle polycarbonate is used. In this case polycarbonate is laboriously hand separated from crushed tail light lenses.

In summary, there has been disclosed a unique process for recycling thermoplastic materials which uniquely enables such plastic materials to be returned to near their original, virgin state or the original, virgin state of similar materials having the properties and characteristics thereof for re-use in the same manner as virgin plastic material. The present process is also usable with painted plastic material and uniquely volatizes and removes such paint from the plastic material thereby permitting the re-use of the plastic material in the same manner as a similar virgin plastic material.

What is claimed is:

1. A process for recycling preprocessed plastic material for re-use as virgin material comprising the steps of:
    particulating recycled preprocessed plastic material having a known composition to form particulates thereof;
    testing the particulates to determine at least one property thereof;
    comparing the at least one tested property with a like property of like, near virgin plastic material to determine a property difference therebetween;
    after testing, introducing the particulates into a twin screw extruder;
    admixing additives to the particulates based on the property difference determined during testing which will substantially eliminate the tested property difference between the particulates and the like property of like near virgin plastic material; and
    extruding the particulates and additives to prepare a plastic material for re-use as virgin plastic material.

2. The process of claim 1 further comprising the steps of:
    after the particulates have passed through the extruder as extruded material, testing the extruded material to determine any difference in the at least one property of the extruded material from the like property of like, near virgin plastic material; and
    if any property difference is determined, repeating the steps of particulating, introducing the particulates into a twin screw extruder and admixing additives until the at least one tested property of the extruded plastic material is substantially equal to the like property of like near virgin plastic material.

3. The process of claim 1 wherein the step of admixing further comprises the step of:
    admixing additives at the feed end of the extruder.

4. The process of claim 1 wherein the step of admixing further comprises the step of:
    admixing additives in separate steps at spaced locations along the length of the extruder.

5. The process of claim 1 further comprising a step of: removing volatile constituents under vacuum at at least one location along the length of the extruder.

6. The process of claim 5 further comprising the step of providing kneading blocks on each screw of the extruder immediately adjacent to a vacuum port disposed along the length of the extruder.

7. The process of claim 1 further comprising the step of:
    selecting additives for admixing with the particulates from the group consisting of antioxidants, heat stabilizers, antistatic agents, lubricants, plasticizers, UV stabilizers, nucleating agents, and coupling agents.

8. The process of claim 1 wherein the step of extruding further comprises the steps of:
    forming a plurality of axially aligned shaft sections on each of the twin screws of the extruder, each shaft section having a thread with a pitch formed thereon; and
    providing kneading blocks at spaced locations along each screw of the extruder.

9. The process of claim 1 further comprising the steps of:
    removing volatile constituents under vacuum at at least one location along the length of the extruder; and
    adding water in predetermined quantities into the extruder immediately before the location where the volatiles are removed from the extruder.

10. The process of claim 9 wherein water is added at levels between 0.2 and 5% by weight of the total polymeric stream.

11. The process of claim 1 further including the step of:
    during extruding, simultaneously withdrawing volatile constituents from the particulates.

12. The process of claim 1 further comprising the step of:
    selecting additives for admixing with the particulates from the group consisting of antimony oxide, block copolymer rubber, maleic anhydride, organic peroxides, calcium carbonates, dolomite, silicates, fiber glass, mica, wollastonite, silica, barium sulfate, carbon, graphite, and methylmethacrylate-butadine-styrene polymer.

13. The process of claim 1 wherein the step of testing comprises:
    testing the particulates to determine at least one of viscosity, elasticity, tensile yield strength, tensile break strength, stiffness, durometer, visual surface appearance, impact resistance, linear mold shrinkage, density, tensile modulus, compressive strength, linear thermal expansion, volume resistivity, surface resistivity, dielectric strength, dielectric constant, and water absorption.

14. The process of claim 1 further comprising the step of selecting additives for admixing with the particulates which are different from the constituents of the particulate plastic material.

15. The process of claim 1 further comprising the steps of:
    first melting the particulated, recycled, preprocessed plastic material with a paint coat in a low shear extruder without a high shear field so as not to excessively disperse paint on the particulated material; and
    then capturing segments of intact paint film at an outlet of the extruder before the step of testing the particulates to determine at least one property thereof.

16. The process of claim 15 further comprising the step of:
    removing volatile constituents under vacuum at at least one location along the length of the extruder; and
    adding water in predetermined quantities into the extruder immediately before the location where the volatiles are removed from the extruder.

* * * * *